Patented Apr. 21, 1936

2,038,345

UNITED STATES PATENT OFFICE 2,038,345

SYNTHETIC RESIN VARNISH AND PROCESS

John D. Cochrane, Jr., Cincinnati, Ohio, assignor to The Formica Insulation Company, Cincinnati, Ohio, a corporation of Ohio No Drawing. Original application July 20, 1933, Serial No. 681,385. Divided and this application January 10, 1934, Serial No. 706,147

7 Claims. (Cl. 134—26)

This invention relates particularly to synthetic resin varnishes or the like, adapted to be applied in liquid form and then hardened; also, to the manufacture of such varnish or lacquer.

The primary object is to provide an improved varnish, or lacquer, which, after being applied as a film and hardened, will be free from danger of "crazing".

It is common to speak of the fine lines which appear in a surface-film as "crazing". This highly objectionable phenomenon is prevented by the use of the invention herein described.

The present application constitutes a division of my application Ser. No. 681,385, filed July 20, 1933.

The invention is particularly valuable in dealing with urea-formaldehyde resin varnishes, or lacquers, which, by means of my improvement, are made to yield a non-crazing, tough, continuous-surface film. The invention may, however, be applied to other varnishes, such as varnishes produced from phenol-formaldehyde condensation products, or other synthetic resin varnishes. The invention posesses value for purposes other than that of producing a non-crazing film, as will be hereinafter indicated.

Various uses for the improved varnish, or lacquer, are set forth in my above-mentioned application. One of the important uses is the provision of a tough continuous-surface film, especially in connection with the manufacture of laminated products.

Urea-formaldehyde resin is inherently hard and brittle in the reacted form. Many attempts have been made to produce a tougher material by the addition of plasticizers, but so far as I am aware no material has been found which does not affect either cure, water resistance, or the light resistance of the urea-formaldehyde resin.

As an example of a varnish composition having as its base a urea-formaldehyde resin, which varnish is adapted to yield a white enameled surface, the following is given:

| | Per cent |
|---|---|
| Urea formaldehyde resin varnish (50% solids) | 80 |
| Titanium oxide white pigment | 15 |
| Finely ground paper fibre | 5 |

In the manufacture of a laminated product, a surface-sheet may be coated or impregnated with a composition varnish of the nature described. The pigment may be of any desired color, or a small percentage of a dye may be added to give desired color. A large variety of colors and gradations of colors may be produced. The surface-sheet may be impregnated or coated with the composition varnish. It may then be applied to a suitable foundation-body and consolidated therewith under heat and pressure. The heat may be applied for a sufficient length of time to convert the urea-formaldehyde resin to the final infusible and substantially insoluble state. Temperatures and pressures comparable to those ordinarily employed in producing laminated phenolic condensation products may be used. The temperature preferably should be considerably above 100° C. A suitable temperature is 135° C. and a suitable pressure is 1100 lbs. per square inch.

In forming the composition varnish, the ingredients should be thoroughly mixed. The application to the surface-sheet may be made in any desired manner, as by dipping, spraying, brushing, or the like.

If desired, the surface-sheet, after being coated and dried, may be applied to a stack of previously prepared sheets of fabric, or paper, which have been impregnated with a phenol-formaldehyde varnish and dried. The whole stack may then be consolidated under heat and pressure and converted to the final infusible state.

The composition varnish given above as an example is adapted to yield a nicely enameled surface, which is of tough, tenacious character, and free from "crazing", or cracking. That is, the surface-film is a smooth, continuous film entirely free from the tendency to develop minute film-ruptures, or "crazing" lines.

Any suitable material may be employed in producing the foundation-sheets, or body-sheets. The same is true with respect to the surface-sheet, paper being preferred ordinarily, especially for the surface-sheet.

For certain purposes, it is desirable to employ a varnish which is free from pigment and which will yield a transparent film; and such a surface-sheet may, if desired, have printed thereon beneath the coating a suitable design, adapted to give a decorative effect. If desired, such a surface-sheet may be applied over a barrier-sheet which is coated or impregnated with a varnish containing a suitable pigment, the barrier-sheet being placed over a stack of previously treated sheets adapted to form a foundation-body. As an example of a varnish adapted to produce a transparent coating, the following is given:

| | Per cent |
|---|---|
| Urea-formaldehyde varnish (50% solids) | 95 |
| Ground paper fibres | 5 |

As an example of a varnish suitable for forming a barrier adapted to cut off undesirable underlying colors, the following is given:

| | Per cent |
|---|---|
| Urea-formaldehyde varnish (50% solids) | 80 |
| Titanium oxide white pigment | 20 |

It may be stated that the ground paper fibres in the clear varnish composition given above become substantially transparent in the film after the consolidating operation. If desired, any suitable dye may be mixed, in small proportion, with the transparent varnish, thereby enabling any desired colors, or shades of colors, to be produced.

For the urea-formaldehyde varnish given in the above examples, a phenol-formaldehyde varnish, or other synthetic resin varnish, may be substituted.

Clean paper flock may be obtained which is substantially free from dirt or specks, and this material may be finely ground, and, in small percentage, suspended in the varnish.

The improved product is highly inert, water-resistant, and has a film surface of sufficient hardness and body to last indefinitely. When a pigment is incorporated in the varnish, the film is of enamel-like character, and may be washed or cleansed, as desired.

The surface-sheets may, if desired, be solid-color sheets; or they may be translucent sheets which become transparent or semi-transparent (when the clear varnish is used) after consolidating under heat and pressure.

In mixing the varnishes, variations in proportions are admissible, depending upon the result desired. Where a white pigment which will give thorough opacity is desired, 15–20% of a pigment like titanium oxide white pigment serves the purpose admirably. Where a heavy color is to be introduced, the percentage of pigment may be reduced. The pigment and the finely ground paper fibres have the effect of giving body to the resin-varnish, thereby rendering the pressing between hot plates, as distinguished from closed molds, readily feasible.

The principle of employing finely ground fibres in a synthetic resin varnish, and preferably associated with the use of pigment, is extremely beneficial when used in connection with urea-formaldehyde resin varnishes. Where great toughness is desired in a clear varnish which is much less subject to danger of "crazing", the same expedient may be used with considerable advantage. For example, it may be used in a phenolic condensation product varnish such as "Bakelite" varnish. In certain situations, this is highly desirable, regardless of whether or not a clear varnish is employed. For example, in molding laminated rods, or tubes, of large diameter, considerable difficulty is experienced in avoiding annular cracks. This tendency can be markedly reduced by using a paper which has been impregnated with a varnish containing ground paper fibres. In the molding operation, this mixture of resin and fibres is free to flow and compensates for the rupturing of the laminations produced in the molding operation. Again, in pressing a laminated sheet with an irregular surface, such as a morocco leather texture, considerable difficulty arises in ordinary practice due to shearing off of the raised portions of the surface in the cooling process, at which time the laminated material contracts more than the embossed metal plate with which it is in contact. If fibres are incorporated in the pigment-varnish film of the surface-sheet, the tendency for raised portions to be broken off the base sheet is practically eliminated. So far as my experience goes, this toughening effect cannot be obtained with the customary plasticizers for phenol resins, because the presence of these high-boiling liquids (plasticizers) in surface-sheets causes sticking to the metal plate on which the material is pressed, producing poor surface and increasing water absorption.

As is known, papers are made from various fibres. Most commonly they are made from wood fibre, cotton fibre, or other vegetable fibre. In the manufacture of paper, ordinarily, the fibres are not chemically attacked or weakened. Clean paper, therefore, is a convenient source for obtaining a desirable clean, strong fibre. Clean, unweakened vegetable fibre is highly desirable, especially where a clear, substantially transparent varnish is required; as indicated above, the principle of employing finely ground fibres in a synthetic resin varnish possesses important advantages. Alpha flock is a highly purified wood fibre which is largely used in paper manufacture. A considerable variety of other vegetable fibres are used in paper making, as is well known.

It is desirable to use comminuted or pulverized paper of about 200 mesh. However, the fineness of the comminution may vary greatly. Pulverized paper of about 25 mesh has been used satisfactorily, and may even be desirable for certain purposes.

Obviously, the proportions of the ingredients of the varnish or lacquer may be varied within reasonable limits, depending upon the purpose to which the composition is to be applied. For example, it may be desirable, especially in heavily pigmented mixes, to employ 8–10% of fibre, because it is rather more difficult to prevent lines of "crazing" in the pigmented mixes than it is in clear films. Other variations, such as will occur to those skilled in the art, are permissible.

The foregoing detailed description has been given for clearness of understanding only, and no undue limitations should be understood therefrom, but the appended claims should be construed as broadly as permissible, in view of the prior art. In the claims, the expression "paper fibres" is intended to include the various fibres used in paper making, but some claims, are specifically limited to vegetable fibre.

What I regard as new and desire to secure by Letters Patent is:

1. A liquid varnish adapted to produce a non-crazing film, comprising a solution of a potentially reactive heat-hardening synthetic resin containing about 5%–10% of pulverized paper fibre having a fineness on the order of about 200 mesh.

2. A liquid varnish composition adapted to produce a non-crazing enamel-like surface, comprising a mixture of about 80% of potentially reactive heat-hardening urea-formaldehyde resin varnish, about 15% of pigment, and about 5% of finely ground paper fibre.

3. A liquid varnish composition adapted to produce a non-crazing clear transparent film, comprising urea-formaldehyde varnish (50% solids) about 95% and finely ground paper fibres about 5%.

4. A liquid varnish composition adapted to produce a transparent non-crazing film, comprising a solution of urea-formaldehyde resin, and finely ground paper fibre, the proportion of the latter being less than one-tenth of the resin-solids in said solution.

5. A liquid varnish composition adapted to produce a non-crazing enamel-like film, comprising a mixture of a solution of potentially reactive heat-hardening urea-formaldehyde resin, a pigment, and finely ground paper fibre, said materials being taken in such proportion that said pigment is on the order of one-third of the resin-solids and said paper fibre is on the order of one-eighth of the resin-solids.

6. A process of producing a varnish adapted to yield a non-crazing film which comprises incorporating in a potentially reactive heat-hardening synthetic resin finely comminuted vegetable paper fibre and a pigment, employing said materials in such proportion that the paper fibre is on the order of one-eighth of the resin-solids and the pigment is on the order of one-third of the resin-solids.

7. A process as stated in claim 6, in which said heat-hardening synthetic resin is urea-formaldehyde resin.

JOHN D. COCHRANE, Jr.